United States Patent [19]
Minoura et al.

[11] 3,975,095
[45] Aug. 17, 1976

[54] CATOPTRIC PROJECTION SYSTEM WITH A SPHERICAL REFLECTING SURFACE

[75] Inventors: Kazuo Minoura, Yokohama; Yoichi Hirabayashi, Machida, both of Japan

[73] Assignee: Canon Kabushiki Kaisha, Tokyo, Japan

[22] Filed: Dec. 23, 1974

[21] Appl. No.: 535,711

[30] Foreign Application Priority Data

Dec. 27, 1973 Japan.................................. 49-3399

[52] U.S. Cl.................................. 353/69; 350/190; 350/200; 350/296; 353/98
[51] Int. Cl.².................... G03B 21/28; G02B 3/06; G02B 17/08; G02B 5/10
[58] Field of Search.......................... 353/69, 98, 99; 350/293, 296, 190, 199, 200, 202

[56] References Cited
UNITED STATES PATENTS

| | | | |
|---|---|---|---|
| 2,017,634 | 10/1935 | Newcomer | 353/98 |
| 2,299,682 | 10/1942 | Conant | 353/98 |

Primary Examiner—Samuel B. Rothberg
Assistant Examiner—Steven L. Stephan
Attorney, Agent, or Firm—Toren, McGeady and Stanger

[57] ABSTRACT

A catoptric projection system in which a projection lens and a spherical convex mirror are arranged with their optical axes intersecting at a point on the mirror at an angle with respect to each astigmatism so that an image is projected from the film plane with light after reflection from the mirror onto a light transmissive screen, thereby it being made possible to achieve a much-desired increase in the magnification of image projected on the screen without involving any increase in the magnification power of the projection lens or in the distance between the film plane and the screen. There is provided a cylindrical refracting surface disposed between the projection lens and the mirror to perform a refractive action in a plane containing both of their optical axes and to contribute an amount of astigmation which is balanced out by that of astigmatism introduced by the convex mirror.

8 Claims, 5 Drawing Figures

3,975,095

CATOPTRIC PROJECTION SYSTEM WITH A SPHERICAL REFLECTING SURFACE

BACKGROUND OF THE INVENTION

This invention relates to catoptric systems for use in microfilm viewers, or motion picture projectors, and more particularly to a catoptric projection system in which a projection lens, a cylindrical lens and a spherical convex mirror are arranged to project the film onto the screen at an increased magnification while compensating for the astigmatism introduced by the mirror.

Catoptric projection apparatus of the conventional type utilize plane mirrors in projecting films onto screens at increased magnifications. With such an arrangement, it is impossible to achieve a much-desired increase in the magnification of the projected image without involving any great increase either in the refractive power of the projection lens or in the optical path length between the film plane and the screen.

SUMMARY OF THE INVENTION

The principal object of the present invention is to provide a catoptric projection system which enables a more increase in the magnification of the projected image to be achieved by employment of a spherical convex mirror arranged between the projection lens and screen as replacing the plane mirror which would be otherwise employed as in the prior art systems, while maintaining almost constant the focal length of the projection lens and the length between the film plane and the screen.

The concomitant object of the present invention is to compensate for the aberration introduced by the spherical reflecting surface when it is arranged in the projection optical path.

With rays of a light beam projected from the projection lens of which the projection axis does not pass through the center of curvature of the spherical reflecting surface, that is, with skew rays, the convex mirror provides a resolving power which is different between the vertical and horizontal components thereof in the projection plane. According to the present invention, such a resolving power difference is minimized by employment of a cylindrical lens which is designed to balance out the astigmatism introduced by the thus eccentrically disposed mirror in the projected image plane transverse to the projection axis. Also the astigmatism for the off-axis rays is reduced to improve the resolving power throughout the entire area of the image field. The cylindrical lens may be arranged so as to constitute part of the projection lens. In this case, however, the interchangeability of the projection lens itself has to be sacrificed.

DESCRIPTION OF THE PREFERRED EMBODIMENT

Figure 1:
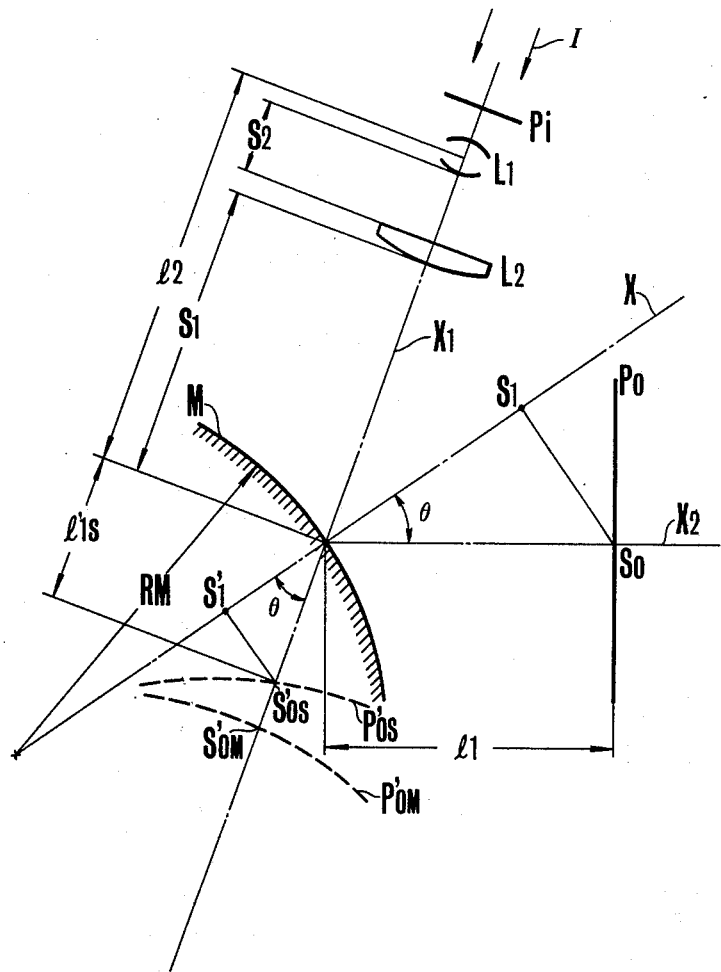
FIG. 1 is a schematic sectional view of one embodiment of a catoptric projection system according to the present invention.
Figure 2:
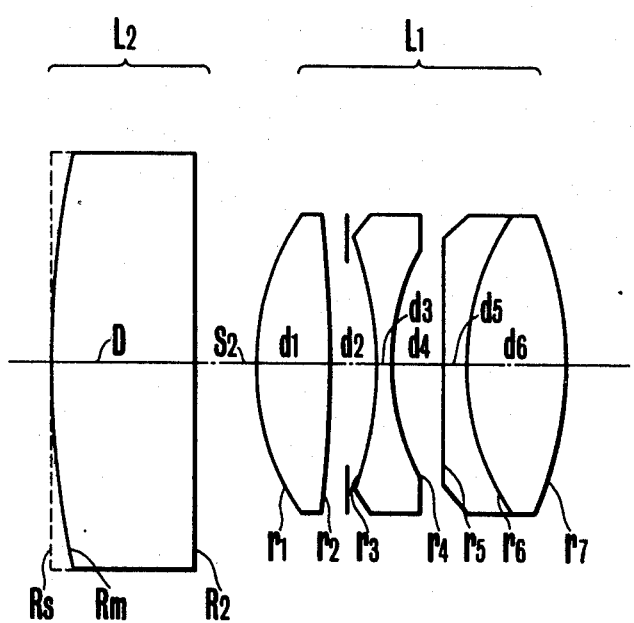
FIG. 2 is a block diagram of an assembly of a projection lens and a cylindrical lens suitable for use in the system of FIG. 1.
Figure 4:
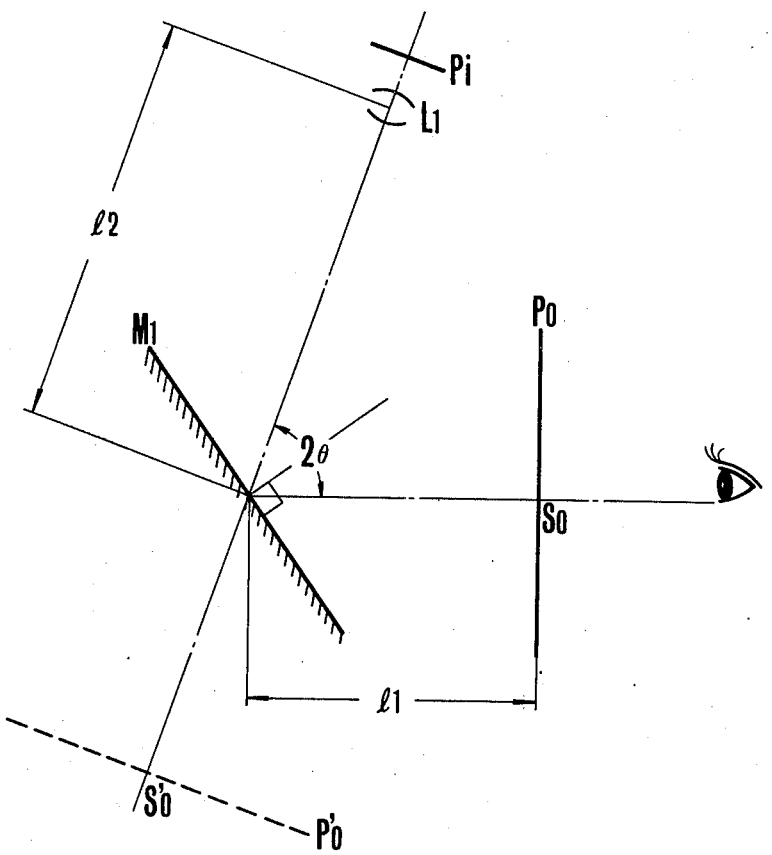
FIG. 4 is a schematic sectional view illustrating a typical conventional catoptric projection system for facilitating the understanding of the invention in comparison therewith.

Referring to FIGS. 1 and 4, there is shown an example of the catoptric projection system embodying one form of the invention in comparison with a prior art system, wherein the projection lens is designated at $L_1$, an object plane arranged in rear of the projection lens $L_1$ and in which there is usually placed a positive or negative film is designated at Pi, and an image plane or projection plane in which there is usually placed a light transmissive screen is designated at Po. The term "rear" as used herein relates to the side of the projection lens nearer to the shorter conjugate, as is usual in the art. The catoptric projection system of the invention shown in FIG. 1 further includes an anamorphotic element $L_2$ in this instance in the form of a cylindrical lens positioned in front of the projection lens $L_1$ in optical alignment therewith, and a spherical convex mirror M having a radius of curvature $R_M$ arranged as replacing the plane mirror $M_1$ of the prior art system of FIG. 4. The convex mirror M is disposed with its optical axis X intersecting the optical axis $X_1$ of the projection lens $L_1$ at a point on the mirror surface at an angle $\theta$ to each other. The projection axis $X_1$ is reflected from the mirror M in a vertical plane containing the axes X and $X_1$ to an axis $X_2$ which intersects the projection plane Po at a center point So thereof at right angles thereto. The vertual image of the projection plane Po by the convex mirror M in the vertical plane as viewed in a direction of the projection lens axis $X_1$ is indicated at curve P'om, while the vertual image as viewed in a direction of the mirror axis X is indicated at a curve P'os.

Now assuming that the cylindrical lens $L_2$ is disposed to perform refractive action in planes parallel to the aforesaid vertical plane but not in planes perpendicular thereto, it is made possible by imparting a suitable refractive power to the cylindrical lens $L_2$ to bring the point S'om in curve P'om corresponding to the point So into coincidence with the point S'os in curve P'os corresponding to the point So, while maintaining the position of the point S'os unchanged in a plane perpendicular thereto. As a result, by selection of a suitably designed cylindrical lens, an image which is projected from the film plane Pi can be brought into focus with equal sharpnesses in the vertical and horizontal components thereof in the projection plane Po. The focussing operation is performed by moving either the entire projection lens $L_1$, or a part of thereof with reference to the film plane Pi along the optical axis thereof. As is understood from FIG. 1, the mirror M contributes to the system a magnification increase which may be estimated in terms of a ratio of $\overline{SoS_1}$ to $\overline{S'osS'_1}$, wherein $S_1$ is the point at which a line perpendicular to the mirror axis X and passing through the point So intersects the mirror axis X; and $S'_1$ is the point at which a line perpendicular to the mirror axis X and passing through the point S'os intersects the mirror axis X.

Figure 3:
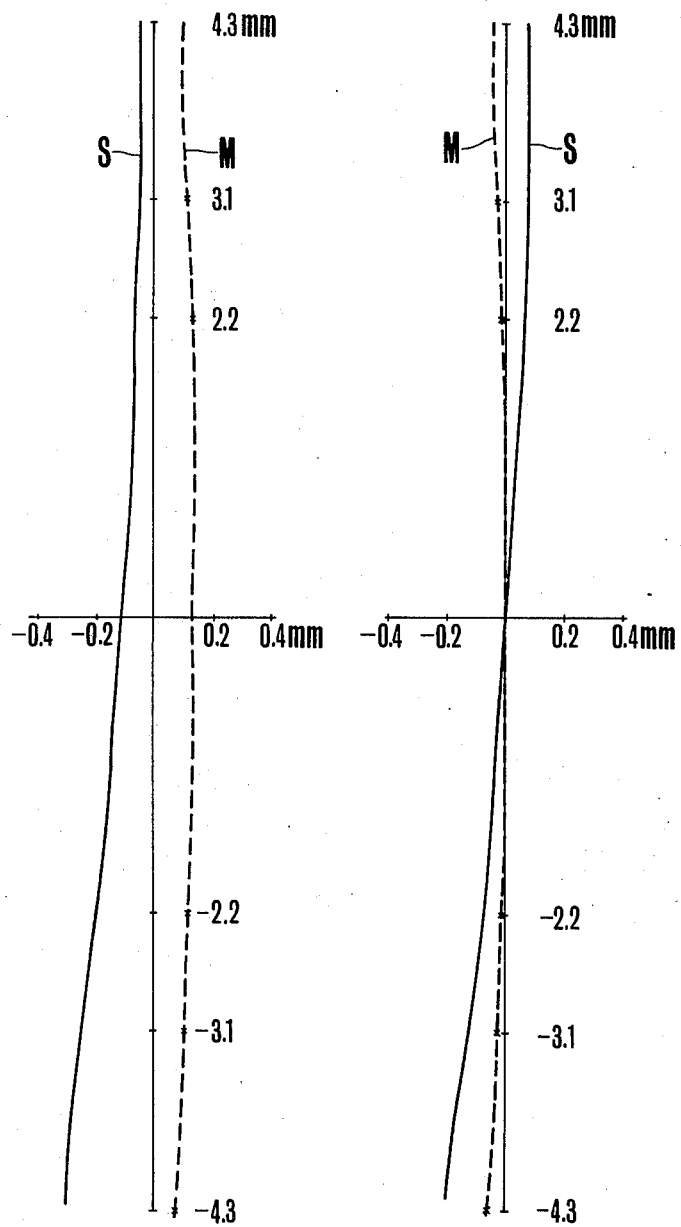
FIG. 3a is a graph illustrating astigmatism variations in a control example of the embodiment of the invention without the cylindrical lens.
FIG. 3b is a graph illustrating astigmatism variations of a specific example of the embodiment of the invention constructed in accordance with the numerical data given in the following table.

FIG. 3 shows how well the astigmatism introduced by the convex mirror M into the system constructed in accordance with numerical values to be described later is corrected by employment of a cylindrical lens $L_2$. Without such a cylindrical lens, astigmatism differences due to the eccentrically disposed convex mirror M are produced as shown in FIG. 3a, resulting in a decrease in the resolving power. The magnitude of power of the cylindrical lens may be in order of about 1% based on that of power of the projection lens $L_1$ for effecting the state of correction of astigmatism as shown in FIG. 3b. In FIG. 3, the ordinate represents the height in the image plane of FIG. 1, and amounts of astigmatism for the vertical and horizontal rays as viewed in FIG. 1 are indicated at curves M and S respectively.

The improvement of the catoptric projection system of the invention with respect to the magnification of the projected image will be better understood by comparison with the conventional system employing a plane mirror $M_1$ arranged as facing an intermediate space between the projection lens $L_1$ and the screen Po spaced apart from each other by an angular distance $2\theta$ as shown in FIG. 4. In this conventional system, an image is projected by the projection lens $L_1$ from the film plane Pi through the plane mirror $M_1$ onto the screen Po at a magnification $\beta_1$ which may be expressed by $$\beta_1 = \frac{1}{f}(l_1 + l_2) \quad (1)$$

wherein f is the focal length of the projection lens $L_1$; $l_1$ is the distance between the mirror M and the center So of the entire area of screen Po; and $l_2$ is the distance between the projection lens $L_1$ and the mirror $M_1$.

On the other hand, in the system of the invention shown in FIG. 1, the magnification $\beta_2$ may be approximated by $$\beta_2 = \frac{l_1}{l'_{1s}} \left( \frac{l_{1s} + l_2}{f} - 1 \right) \quad (2)$$

provided that the power of the cylindrical lens $L_2$ is negligible as compared with that of the projection lens $L_1$, wherein $l'_{1s}$ is the distance between the point S'os and the point at which the axes X and $X_1$ intersect from equations (1) and (2), we obtain $$\beta_2 - \beta_1 = (1 - \frac{l_1}{l'_{1s}})(1 - \frac{l_2}{f}) \quad (3)$$

If $l_2 > f$, then $\beta_2 - \beta_1 > 0$, because of $l_1/l1s > 1$

An example of a specific catoptric projection apparatus of the invention may be constructed in accordance with the numerical data given in the following table.

| f: 24mm | Relative aperture: 1 : 3.5 | Magnification $\beta_2$: 22.9 |
|---|---|---|
| $l_1 = 330$ | $l_2 = 144.92$ | $l'_{1s} = 181.4$ |
| $R_M = 660.$ | | |
| | $s_1 = 134.57$ | |
| $R_m = 1351.35$ | | |
| $R_s = \infty$ | | |
| | $D = 5.$ | $N = 1.51633$ |
| $R_2 = \infty$ | | |
| | $s_2 = 2.$ | |
| $r_1 = 10.154$ | | |
| | $d_1 = 2.34$ | $n_1 = 1.69100$ |
| $r_2 = -126.25$ | | |
| | $d_2 = 1.57$ | |
| $r_3 = -15.889$ | | |

-continued

| f: 24mm | Relative aperture: 1 : 3.5 | Magnification $\beta_2$: 22.9 |
|---|---|---|
| $l_1 = 330$ | $l_2 = 144.92$ | $l'_{1s} = 181.4$ |
| | $d_3 = 0.71$ | $n_2 = 1.61293$ |
| $r_4 = 8.933$ | | |
| | $d_4 = 1.65$ | |
| $r_5 = -115.445$ | | |
| | $d_5 = 0.89$ | $n_3 = 1.69895$ |
| $r_6 = 9.3667$ | | |
| | $d_6 = 3.2$ | $n_4 = 1.80610$ |
| $r_7 = -13.616$ | | |
| $\theta = 35°$ | | |
| Diaphragm : 0.47 in front of $r_3$ | | | in which $R_M$ is the radius of curvature of the convex mirror; $R_m$ and $R_s$ are the vertical and horizontal radii of curvature of the front surface of the cylindrical lens element respectively; $R_2$ is the radius of curvature of the rear surface of the cylindrical lens element; D is the axial thickness of the cylindrical lens element; N is the index of refraction of the cylindrical lens element; $s_1$ is the interval between the convex mirror and the cylindrical lens element; $s_2$ is the interval between the cylindrical lens and the projection lens; $r_1, r_2 \ldots$ are the radii of curvature of each element surface in the projection lens system with the respective surface being numbered from the front to the rear of the projection lens and being identified respectively by a subscript numeral for each r; $d_1, d_2 \ldots$ are the axial intervals between the successive two surfaces with each interval being identified by its respective numeral subscript successively from front to rear; $n_1, n_2 \ldots$ are the indices of refraction of each lens element with each refractive index being identified by its respective numeral subscript successively from front to rear; and $\theta$ is the angle of reflection of the projection axis by the convex mirror.

In this example, if the convex mirror M is replaced by a plane mirror $M_1$, the magnification becomes $\beta_1 = 18.8$. In order to increase the magnification from 18.8 to 22.9, while using the plane mirror $M_1$ instead of the convex mirror M, therefore, it is necessary to adjust the distance between the projection lens and the screen to a value $(l'_2 + l'_1)$.

$$l'_2 + l'_1 = f(1 + \beta_2) = 573.6 \text{ (mm)}$$

Hence, the screen Po must be displaced away from the mirror $M_1$ to thereby cause an increase in the bulk of the apparatus.

As the light transmissive screen, use may be made of any conventional screen such as a ground glass. The screen itself does not constitute the essential part of the invention. Further, instead of using the cylindrical lens as the anamorphotic element, it is possible to use a glass block of which the index of refraction continuously varies in only one direction so as to function as a cylindrical lens of the nature described.

It will be seen from the foregoing description that the invention contemplates the use of a spherical convex mirror in combination with a cylindrical lens for achieving a more increase in the magnification of the projected image while the astigmatism introduced by the mirror is well corrected for high grade imaging performance without involving either any decrease in the focal length of the projection lens or any increase in the distance between the object plane and the image plane, or otherwise the focal length of the projection lens should be shortened, thereby either complicating the aberrational problems or increasing the bulk of the apparatus.

What is claimed is:

1. A catoptric system of the type having a spherical reflecting surface, comprising a projection lens element, an anamorphotic element, a spherical mirror and a projection screen, said projection lens element and said anamorphotic element being arranged on a common optical axis;

said projection lens being disposed with its optical axis making an angle with respect to the optical axis of said spherical mirror; and said anamorphotic element having at least one cylindrical refracting surface and being disposed to perform a refractive action in a plane containing the optical axes of said projection lens element and spherical mirror but not in planes perpendicular thereto.

2. A catoptric system of the type as described in claim 1, wherein said projection lens element, anamorphotic element and spherical mirror are arranged on a common axis in this order with respect to the projection light, said spherical mirror is disposed with its convex reflecting surface facing toward said screen;

said screen is disposed with its normal line being contained in said plane containing said two optical axes and making an angle equal to that at which said two optical axes intersect at a point with respect to the optical axis of said convex mirror; and said anamorphotic element is provided with at least one cylindrical refracting surface.

3. A catoptric system of the type as described in claim 2, wherein said anamorphotic element has a plano-convex cylindrical lens disposed with its convex refracting surface facing toward said convex mirror.

4. A catoptric system of the type as described in claim 2, wherein said screen is of the light transmissive type.

5. A catoptric system of the type having a spherical reflecting surface and adapted for use in projecting an image with light from an object onto a projection plane by use of a projection lens in an optical path that is at least one time reflected from said spherical reflecting surface, characterized in that:

said projection lens is provided with at least one cylindrical refracting surface and is disposed with its optical axis making an angle with respect to the optical axis of said spherical reflecting surface; and said cylindrical refracting surface is disposed to perform its refractive action in a plane containing both the optical axes of said projection lens and spherical reflecting surface but not in planes perpendicular thereto and is configured to contribute aberrations which can be balanced out by those introduced by said spherical reflecting surface.

6. A catoptric system of the type as described in claim 5, wherein said spherical reflecting surface is of a convex mirror; and said cylindrical refracting surface is formed in one lens element.

7. A catoptric system of the type having a spherical reflecting surface, comprising a projection lens element, an anamorphotic element, a spherical mirror and a projection screen, said projection lens element and said anamorphotic element being arranged on a common optical axis;

said projection lens being disposed with its optical axis making an angle with respect to the optical axis of said spherical mirror;

said anamorphotic element having at least one cylindrical refracting surface and being disposed to perform a refractive action in a plane containing the optical axes of said projection lens element and spherical mirror but not in planes perpendicular thereto;

the characteristics of the various elements of said system and their spatial relationships to each other being substantially of the proportions indicated by the numerical data in the following table in which;

$R_M$ is the radius of curvature of the convex reflecting surface, $R_m$ and $R_s$ are the vertical and horizontal radii of curvature of the front surface of the cylindrical lens element, respectively, $R_2$ is the radius of curvature of the rear surface of the cylindrical lens element, D is the axial thickness of the cylindrical lens element, N is the index of refraction of the cylindrical lens element, $l_1$ is the interval between the projection plane and the convex mirror, $s_1$ is the interval between the convex mirror and the cylindrical lens element, $s_2$ is the interval between the cylindrical lens and the projection lens, $r$ is the radii of curvature of each element surface in the projection lens with the respective surfaces being numbered from the front to the rear of the projection lens and being identified respectively by a subscript numeral for each $r$, $d$ is the axial intervals between the successive two surfaces with each interval being identified by its respective numeral subscript successively from front to rear, $n$ is the indices of refraction of each lens element with each refractive index being identified by its respective numeral subscript successively from front to rear; and $\theta$ is the angle of reflection of the projection axis at the convex reflecting surface:

Focal length of the projections lens: 24mm
Relative aperture 1:3.5

| | | |
|---|---|---|
| $R_M = 660.$ | $l_1 = 330.$ | |
| $R_m = 1351.35$ | $s_1 = 134.57$ | |
| $R_s = \infty$ | D = 5. | N = 1.51633 |
| $R_2 = \infty$ | $s_2 = 2.$ | |
| $r_1 = 10.154$ | $d_1 = 2.34$ | $n_1 = 1.69100$ |
| $r_2 = -126.25$ | $d_2 = 1.57$ | |
| $r_3 = -15.889$ | $d_3 = 0.71$ | $n_2 = 1.61293$ |
| $r_4 = 8.933$ | $d_4 = 1.65$ | |
| $r_5 = -115.445$ | $d_5 = 0.89$ | $n_3 = 1.69895$ |
| $r_6 = 9.3667$ | $d_6 = 3.2$ | $n_4 = 1.80610$ |
| $r_7 = -13.616$ | | |
| $\theta = 35°.$ | | |

8. A projection system comprising a projection lens, a magnifier, and a supplementary lens device having an optical axis common with the optical axis of the projection lens, said magnifier including a spherical mirror having an optical axis different from the optical axis of said projection lens so as to produce a magnification greater along one direction than the other and said supplementary lens having at least one refracting surface for producing a magnification less in the one direction than the other.

* * * * *